(12) United States Patent
Chen et al.

(10) Patent No.: US 7,644,069 B2
(45) Date of Patent: Jan. 5, 2010

(54) SEARCH RANKING METHOD FOR FILE SYSTEM AND RELATED SEARCH ENGINE

(75) Inventors: Wei Zhu Chen, Beijing (CN); Zhong Su, Beijing (CN); Li Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 11/679,379

(22) Filed: Feb. 27, 2007

(65) Prior Publication Data

US 2007/0276807 A1    Nov. 29, 2007

(30) Foreign Application Priority Data

Mar. 30, 2006  (CN)  ............... 2006 1 0066298

(51) Int. Cl.
*G06F 17/30* (2006.01)
(52) U.S. Cl. .................. 707/3; 707/2; 707/4; 707/5; 707/E17.01; 707/E17.108; 707/E17.14
(58) Field of Classification Search ............... 707/2–5, 707/E17.01, E17.108, E17.14
See application file for complete search history.

(56) References Cited

U.S. PATENT DOCUMENTS

| 6,327,590 | B1 * | 12/2001 | Chidlovskii et al. | ............ 707/5 |
| 6,460,036 | B1 * | 10/2002 | Herz | ........................ 707/10 |
| 2005/0086260 | A1 * | 4/2005 | Canright et al. | ......... 707/104.1 |

* cited by examiner

*Primary Examiner*—Tim T. Vo
*Assistant Examiner*—Shiow-Jy Fan
(74) *Attorney, Agent, or Firm*—Gibb I.P. Law Firm, LLC

(57) ABSTRACT

The present invention provides a search ranking method suitable for a file system, including receiving a query, calculating final relevance scores of individual file items with respect to the query at least partially in accordance with energy scores of individual nodes on a current file system energy tree, and outputting a list of search results based on the final relevance scores. The file system energy tree is updated in response to an operation on the file system performed by a user, wherein the file system energy tree has a tree structure corresponding to that of the file system, and the individual nodes thereof respectively corresponds to the individual file items in the file system

19 Claims, 7 Drawing Sheets

SEARCH RANKING METHOD FOR FILE SYSTEM AND RELATED SEARCH ENGINE

RELATED APPLICATIONS

This application claims priority to People's Republic of China Application No. 200610066298.1 filed on Mar. 30, 2006.

FIELD OF THE INVENTION

The present invention generally relates to search ranking of specific information items, and particularly to a search ranking method for a file system, a related search engine and a computer program product.

BACKGROUND OF THE INVENTION

With the continuous development of computer technologies, people rely on computer systems (including computer networks) increasingly for storage of huge information. Search engines that are widely used nowadays aim to facilitate users' retrieval from a large amount of information so as to obtain helpful information conveniently and rapidly. In the field of information retrieval, search engines have achieved great success, and many useful technologies has been developed and adopted. Among them, various technical improvements and optimizations of search engines are directly reflected in search ranking.

An important search ranking technology is to rank web pages by using hyperlinks between such web pages, such as the PageRank algorithm proposed in 1998 by Sergey Brin and Lawrence Page—the founders of Google and the HITS algorithm proposed by J. Kleinberg in the same year. The basic principle of PageRank is to utilize the link relationship between web pages so as to calculate importance of the web pages, i.e. authority scores of the web pages. The PageRank algorithm follows two primary premises: a web page, which has been cited many times, might be very important; and a web page, which has not been cited many times but has been cited by (a) important web page(s), might also be very important. The Google search engine calculates the PageRank score of a web page with the PageRank algorithm, and accordingly determines the position where a web page appears in a set of search results. Higher the PageRank score of a web page, higher the position of this web page in the results. With the application of the PageRank algorithm, conventional search ranking methods are improved, accuracy in search results is increased, and the average time a user spends on finding his actually expected web page(s) is significantly shortened.

However, such a search ranking method based on link analysis is not suitable for a file system. The main reason is that, in a file system, no association which is similar to web link exists among files. In addition, although the dataset of a file system is not as large as that of the web, the data type in a file system is much more than that in the web.

Currently, search ranking in a file system is mainly implemented with a keyword-based search method. The basic principle of a conventional keyword-based search method is that, the search engine first analyzes contents of a document, extracts keywords in the document, counts up frequency and position where a specific keyword appears in the document as well as the number of documents containing this keyword in an entire set of documents, and creates index for these information. After a user inputs a query, the search engine first analyzes the query request, finds corresponding documents containing each keyword in the index, then calculates a final relevance score with respect to the query for each document, and finally ranks the documents in accordance with the magnitude of the final relevance scores and returns the ranked result to the user. Such a method is difficult in that, in most cases, a user's query request cannot be precisely described with very simple keywords and the accuracy of its search results is relatively low due to the limitation of natural language understanding techniques and the method for calculating final relevance score.

Besides the conventional keyword-based search method, a search log analysis method can also be utilized to make further improvements on search results in search ranking of a file system. Based on the user's feedback and operation on search results, including inputting query words and clicking history, the search log analysis method can make further analysis on a user's search interest, track the user's searching characters so as to improve search effects.

However, both the conventional keyword search methods and the search log analysis method neglect the impact of the tree structure of a file system on search ranking, and with both methods, potential relations between files are not reflected in ranking.

It can be seen that the prior art fails to provide users with a search ranking scheme which is suitable for the structural characteristics of a file system and which can dynamically adapt to user's interactions.

SUMMARY OF THE INVENTION

To overcome deficiencies in the prior art, the present invention provides a search ranking method, a related search engine as well as a computer program product which are adapted to a method of searching a file system using interactions between a user and a search engine system, based on the structure of the file system.

According to an aspect of the present invention, there is provided a search ranking method suitable for a file system, comprising: receiving a query; calculating final relevance scores of individual file items with respect to the query at least partially in accordance with energy scores of individual nodes on a current file system energy tree, and outputting a list of search results based on the final relevance scores; and updating the file system energy tree in response to an operation on the file system performed by a user, wherein the file system energy tree has a tree structure corresponding to that of the file system, and the individual nodes thereof respectively correspond to the individual file items in the file system.

According to another aspect of the present invention, there is provided a file system search engine, comprising a file search module, a file index, and a search results ranking module, the file system search engine being adapted for searching for a file item in accordance with a received query and outputting a list of search results, the file system search engines further comprising: a file system energy tree index for recording a file system energy tree having a tree structure corresponding to that of the file system and energy scores of individual nodes thereof, the individual nodes respectively corresponding to the individual file items in the file system; and an energy tree updating module for updating the file system energy tree recorded in the file system energy tree index in response to an operation on the file system performed by a user, wherein the search results ranking module is used for calculating final relevance scores of individual file items with respect to the query at least partially in accordance with the respective energy scores of the individual nodes recorded in the current file system energy tree index so as to rank the file items in the list of search results in accordance with the final relevance scores.

According to still another aspect of the present invention, there is provided a computer program product containing computer program codes used for implementing a method according to the present invention.

With the present invention, when a user conducts file system search, interested files and file folders are usually arranged in relatively higher positions of the list of search results. Moreover, with the increase in the user's clicks on the file, the energy distribution in the energy tree continues to be updated, so that search ranking can keep tracking the user's interest or preference in response to the user's interactions and duly adjust the list of search results so as to be adapted to changes in the user's interest or preference dynamically.

Other features and advantages of the present invention will become more apparent from the detailed description of the embodiments of the present invention, taken in conjunction with the accompanying drawings.

DESCRIPTION OF THE PREFERRED EMBODIMENTS

Hereinafter, the embodiments of the present invention will be described with reference to the accompanying drawings.

Figure 1:
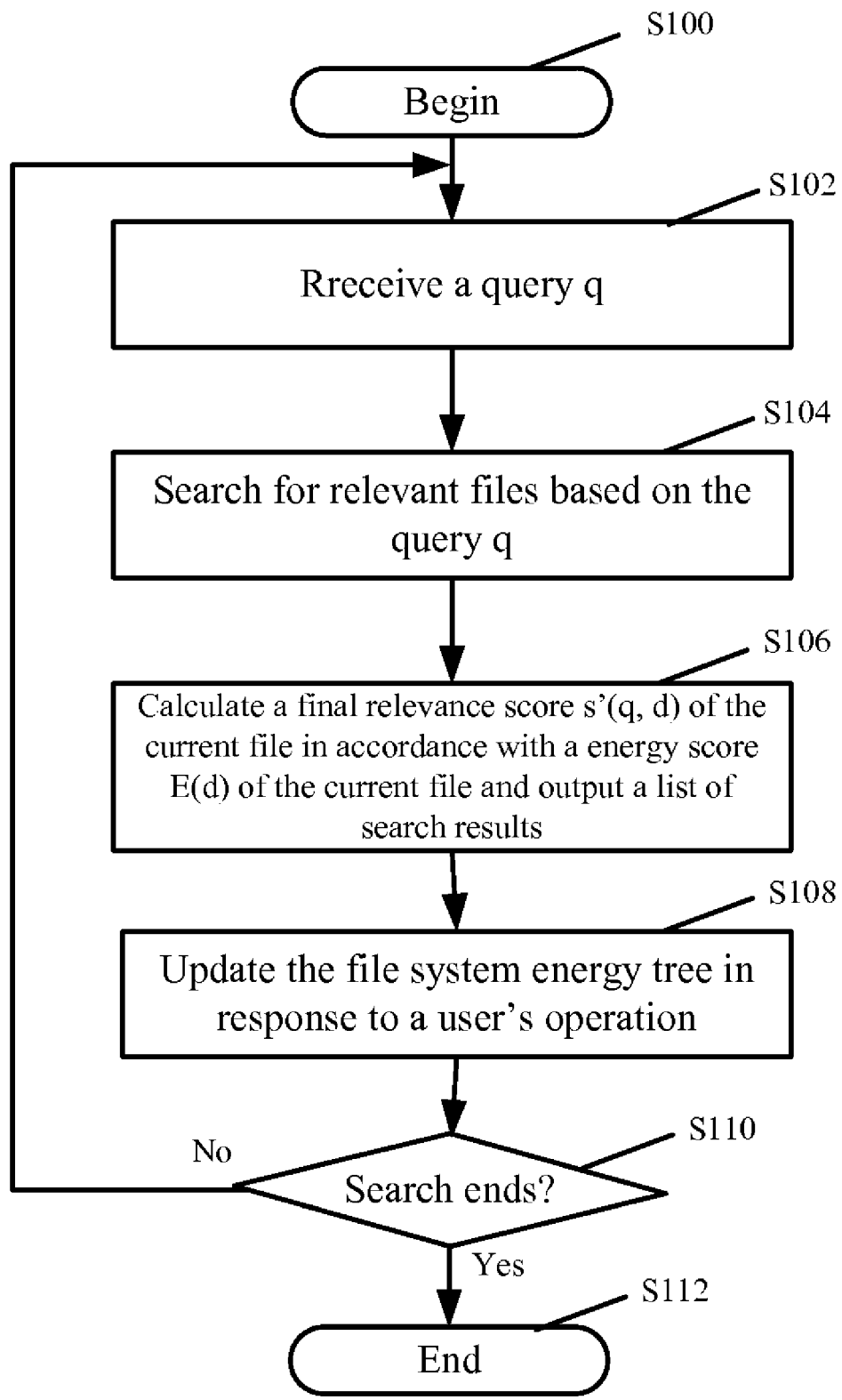
FIG. 1 shows a process flow of search ranking according to an embodiment of the present invention.

FIG. 1 shows a process flow of search ranking according to an embodiment of the present invention.

As shown in FIG. 1, in step S100, the process flow begins.

In step S102, a query q inputted by a user is received. Step S104, file item search is conducted in accordance with the query q. For example, if the adopted file system search engine is a keyword-based search engine, then the file system search engine can calculate an content score s (q, d) of each file item d for the query q with information in a file system index, based on the query q. Generally, the content score s (q, d) acts as a basis for ranking of search results in a conventional file system search engine.

Those skilled in the art will appreciate from the following description that although the keyword-based search has been provided here as an example, the technical solution of the present invention is not limited to any specific prior art, which is adopted for implementing this search step. Moreover, the process of file item search in accordance with the query q may be implemented with any known algorithm, process and manner, and how to implement the process does not belong to the scope of the present invention.

In step S106, based on the content score, a final relevance score for each file is calculated in accordance with a current file energy score and a list of search results is outputted.

According to the present invention, before any specific search ranking process is initiated (such as during initialization of the file system search engine), based on the structure of a file system (the file system may correspond to a tree structure with directories as non-leaf nodes and files as leaf nodes) the file system search engine firstly creates a file system energy tree with a structure same as that of the file system, wherein the score of each node thereof represents the energy score of a corresponding file or file folder and an energy score is a parameter indicating the user's interest or preference for the file or file folder. During this initialization process, the energy scores of all nodes may be equal to one another.

As described in step S104, the file system search engine will provide each file d with a content score s (q, d) for ranking in accordance with the received query q. According to information provided in the current file system energy tree and the content score for ranking, a final relevance score s' (q, d) for each file is calculated so as to be used in final search ranking. For example, for a file d and a given query q, the relation among the final relevance score s' (q, d), the content score s(q, d) and the energy score E(d) may be defined with the following formula:

$$s'(q, d) = \beta s(q, d) + (1-\beta)E(d)$$

wherein $\beta$ is a parameter between 0 and 1 and used for striking a balance between the proportion of the final relevance score and the energy score in the final relevance score.

Hence, the list of search results outputted based on final relevance scores in this step at least partially reflects the user's interest or preference while operating the file system.

In step S108, the file system energy tree is updated in response to an operation of the file system performed by the user (such as querying, opening a file or a file folder, inserting a file or a file folder, or deleting a file or a file folder, etc), so that the file system energy tree can dynamically reflect the current structure of the file system and the user's interest or preference for a certain type of files or file folders.

In step S110, it is judged whether the search has ended.

If the judgment result is "yes", then in step S112 the process ends.

If the judgment result is "no", then the process returns to step S102 to receive a new query q and proceed with the subsequent steps.

An energy score is a parameter that dynamically reflects a user's interest or preference while operating the file system. By introducing the file energy score to the ranking scheme, search results will be ranked at least partially based on the user's interest or preference, and therefore the user can find his desired files or file folders in a more convenient and efficient way.

Hereinafter, a detailed description will be given to illustrate how to dynamically update the file system energy tree so as to make it duly and effectively reflect user's interest or preference.

Figure 2:
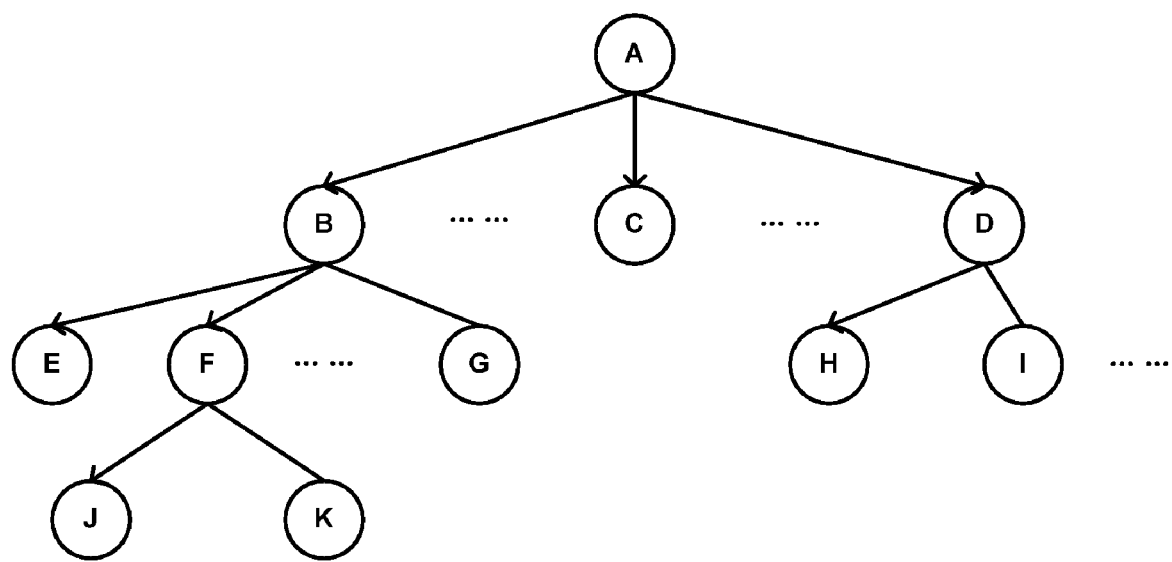
FIG. 2 schematically shows an example of a file system energy tree created during initialization of a file system search engine.

To facilitate the following description, firstly, some basic terms are defined:

Leaf node d: as described above, in the file system, a leaf node refers to a file in any format, such as html, doc, pdf, etc;

Non-leaf node f: as described above, in the file system, a non-leaf node refers to a file folder (Here and hereinafter, each file folder is deemed to contain a file(s) for the purpose of convenience. In practical implementations, an empty file folder may be equivalently treated as a leaf node);

Node n: it includes both leaf node and non-leaf node;

Transfer depth: it represents the scope of the energy transfer during the process in response to user's interaction, and may be represented as, for example, the maximum number of paths through which the energy is transferred in the scope FIG. 2 schematically shows an example of a file system energy tree created during initialization of the file system search engine.

As shown in FIG. 2, root node A of the energy tree is a non-leaf node and may correspond to root directory A of the file system. The child nodes of the node A include nodes B, C and D, among which the leaf node C corresponds to file C under the root directory A and the non-leaf nodes B and D respectively correspond to file folders B and D under the root directory A. Likewise, what is connected with the node B includes child nodes E, F and G, among which the leaf nodes E and G respectively correspond to files E and G in the file folder B and the non-leaf node F corresponds to file folder F in the file folder B. What is connected with the node F includes leaf nodes J and K, which respectively correspond to files J and K in the file folder F. What is connected with the node D includes leaf nodes H and I, which respectively correspond to files H and I in the file folder D.

During initializing the energy tree shown in FIG. 2, the energy scores of all nodes may be set as the same score.

Figure 3A:
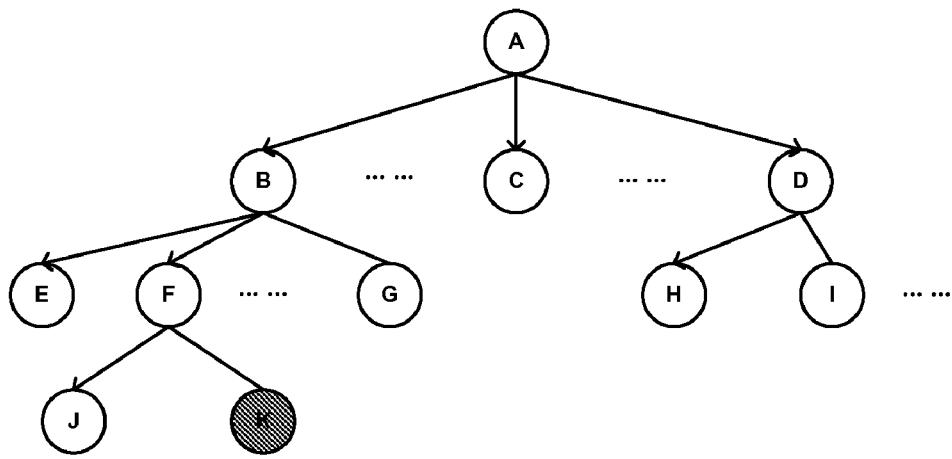
FIGS. 3A, 3B and 3C schematically show updating of energy scores of the file system energy tree as shown in FIG. 2 after a user clicks a file.
Figure 3B:
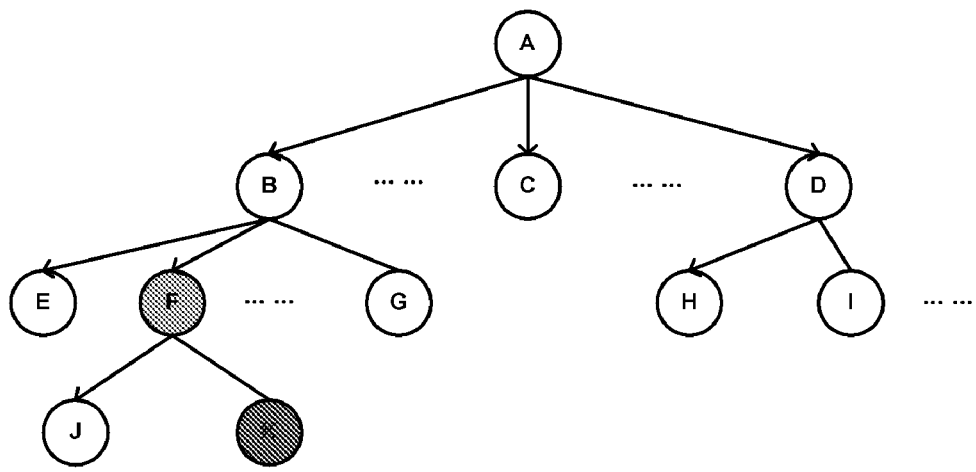
Figure 3C:
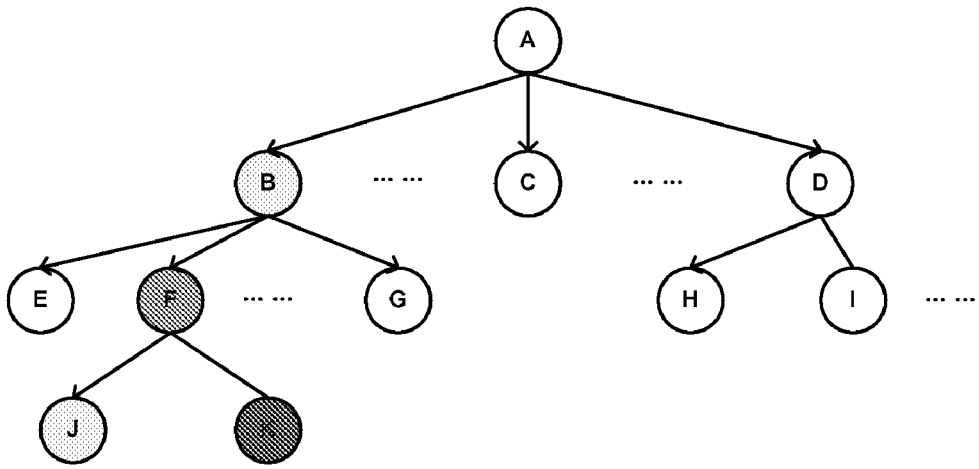

FIGS. 3A, 3B and 3C schematically show update of energy scores of the file system energy tree as shown in FIG. 2 after the user clicks a file.

When a file, the file K for example, is clicked by the user, it may be deemed that the user is more interested in the file K than other files. Thus, as shown in FIG. 3A, the energy score of the corresponding node K is added in response to this click. At this point, the node K becomes a source node.

In the context of searching and ranking, when the user is interested in the file K, it does not mean that he is only interested in this file, but indicates that he might be interested in some files and file folders that are closely related to the file K. Because the user is used to putting related or category-like files under the same directory or in the same file folder, such files closely related to the file K might include the file folder F (a father node on the tree structure) and the file J (a sibling node on the tree structure) in the same file folder F as the file K. Thus, all the added energy does not statically stay at the node K.

According to an embodiment of the present invention, the energy will be transferred via the links connecting with the node K in accordance with the structure of the file system energy tree. As shown in FIG. 3B, part of the energy of the node K per se is transferred to the node F. Then, as shown in FIG. 3C, the node F partly transfers its own energy to its child node J and its father node B via the links connecting with the node F. The rest may be deduced by analogy. The energy is transferred within the file system energy tree.

To improve the efficiency of this energy transfer algorithm, the energy transfer depth when adding energy to a node, i.e. the maximum number of paths through which the energy is transferred may be specified in an implementation of the present invention. In the example shown in FIG. 3C, it is specified that the transfer depth is equal to 2. The energy is transferred to the node B that acts as the grandfather node of the node K, the source node, and the paths or distance between the node B and the node K is 2. Since it is specified that the transfer depth is equal to 2, the node B will not transfer the energy to its father node A or its child nodes E, G. Of course, those skilled in the art will appreciate that the transfer depth can be selected based on a specific file system and requirements for search ranking, and therefore the transfer depth does not constitute limitations on the present invention, and that the energy transfer may be further defined by combining the energy transfer depth with other limiting conditions. For example, it may be specified that the transfer depth is equal to 3 and the energy is just transferred to the grandfather node of the source node at farthest. Under such a composite condition, the node B may transfer its energy to its child nodes E and G, but will not transfer its energy to its father node A. Therefore, a limiting condition for energy transfer may be set very flexibly.

In the search ranking method according to the present invention, better ranking effects can be produced through at least partially taking the energy score of each node as the final relevance score of a file corresponding to the node. For example, in FIG. 3C, since the node K has more energy than the node B, when they have same scores with respect to the query q respectively, the final relevance score of the node K will be higher than that of the node B. Then, the file K will take a better ranking position on the list of search results, such as a much higher position on the list. In such a way, files and file folders that the user is interested in are usually arranged in relatively higher positions on the list of search results, which facilitates the user's search. Moreover, with the increase of file clicks from the user, energy will be added to the clicked source node and its neighbor nodes, and thus the energy distribution of the energy tree will be updated continuously. Therefore, based on the file system energy tree, the process of search ranking can keep tracking the user's interest or preference and duly adjust the list of search results so as to be adapted to the changes in the user's interest or preference dynamically.

Figure 4:
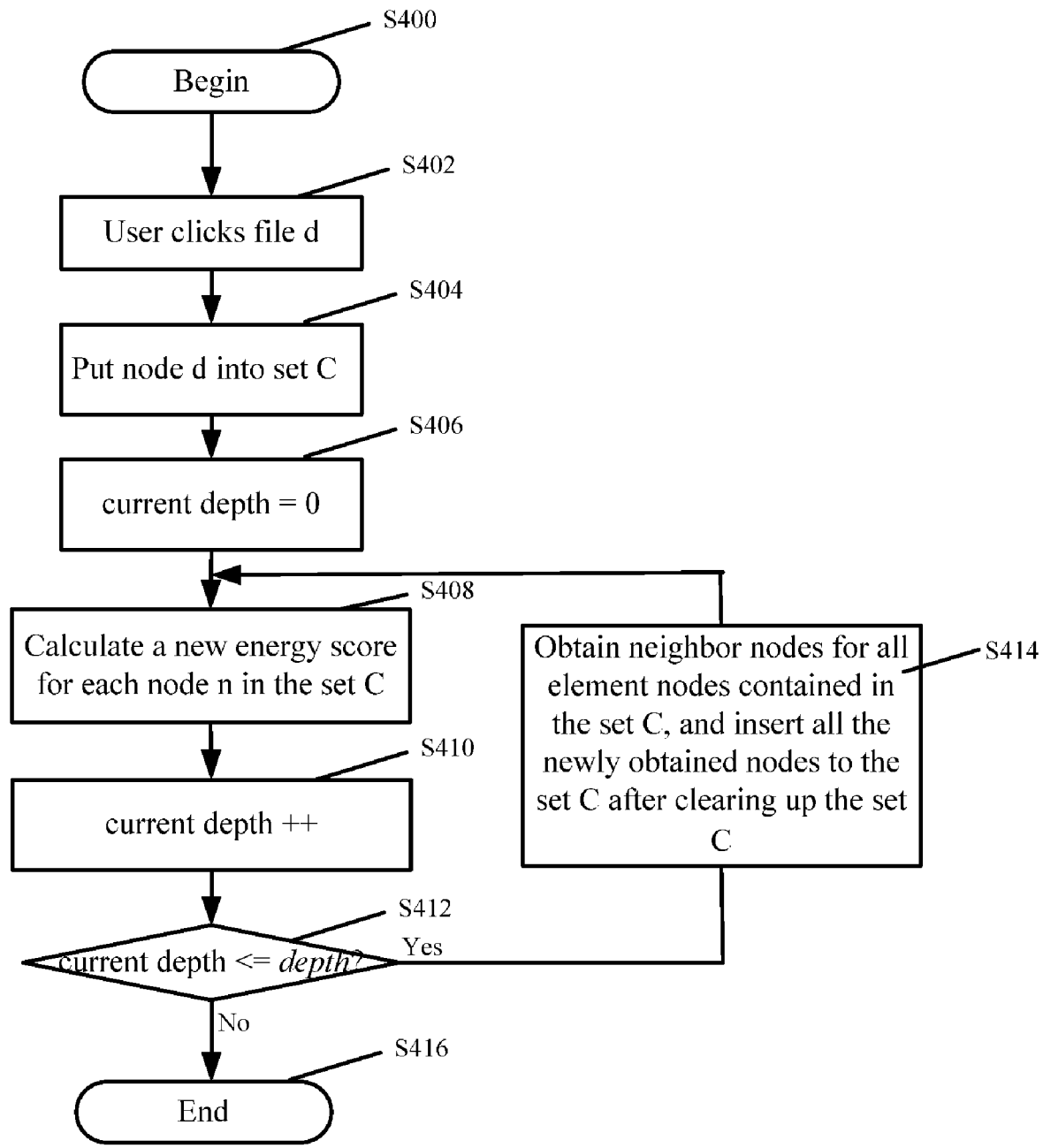
FIG. 4 shows a flow of updating a file system energy tree in response to a user's click according to an embodiment of the present invention.

FIG. 4 shows a flow of updating a file system energy tree in response to a user's click according to an embodiment of the present invention.

As shown in FIG. 4, in step S400, the process flow begins.

In step S402, the file d is clicked by the user.

In step S404, a node d corresponding to the file d is put into a set C that has been initialized in advance, wherein the set C is used for containing nodes whose current energy scores will be updated.

In step S406, the current depth is initialized as 0.

In step S408, a new energy score of each node n (n∈C) in the set C is calculated, wherein the new energy score E' (n) of each node n satisfies:

$$E'(n) = E(n) + p^{dist(n,d)}$$

wherein, E(n) is the original energy score of the node n; p is the energy transfer rate with a value ranging from 0 to 1; dist (n, d) represents the distance from the node n to the node d along paths of the tree on the structure of the file system energy tree. For example, the energy score of the file clicked by the user will increase by 1; since the distance from the node to its father node is 1, the energy of its father node will be increased by $p^1$; and since the distance from the node to its grandfather node and its sibling nodes is 2, the energy scores of its grandfather node and its sibling nodes will be increased by $p^2$ respectively.

In step S410, the current depth is increased by 1.

In step S412, it is judged whether the current depth is smaller than or equal to the transfer depth.

If the judgment result in step S412 is "yes", then the process proceeds with step S414.

In step S414, neighbor nodes for all element nodes in the current set C are obtained, and all the newly obtained nodes are inserted to the set C after the current nodes in the set C have been cleared up. The neighbor nodes of a node refer to the nodes directly connected with the node, including its father node and its child nodes (if any).

After step S414, the process returns to step S408 to continue the process.

If the judgment result in step S412 is "no", then the process ends in step S416.

It should be noted that those skilled in the art may select different values for the energy transfer rate p and the transfer depth, or even design other energy transfer formulae so as to be adapted to the characteristics of specific file systems and search requirement. For example, the transfer depth may not be specified, and the distance for energy transfer may be limited only by the magnitude of the energy transfer value $p^{dist(n,d)}$. That is to say, an energy transfer threshold may be predefined. For each related node, if its energy transfer value $p^{dist(n,d)}$ is larger than said threshold, then it continues to transfer its energy to its neighbor nodes; if its energy transfer value $p^{dist(n,d)}$ is smaller than or equal to said threshold, then it stops transferring its energy to its neighbor nodes.

Figure 5:
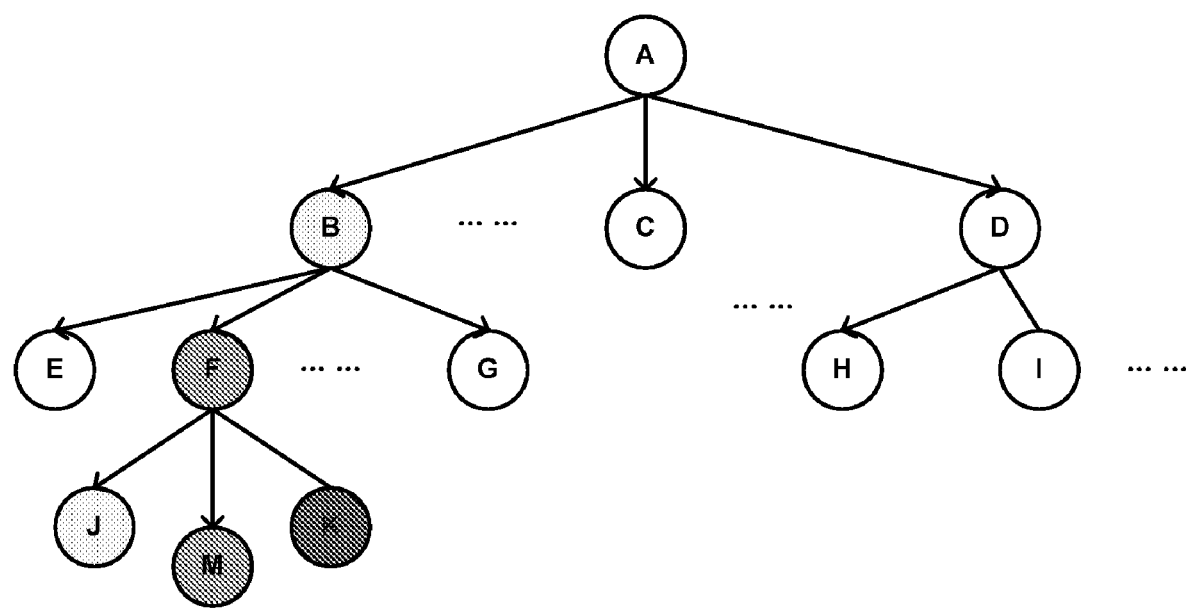
FIG. 5 schematically shows update of energy scores of the file system energy tree as shown in FIG. 3C when a user creates a new file.

FIG. 5 schematically shows updating of energy scores of the file system energy tree as shown in FIG. 3C when a user creates a new file. The user creates in the file folder F a new file M that corresponds to a child node M of node F. A corresponding energy score may be directly assigned to the node M. For example, the node M may be assigned to have energy score same as that of its father node F.

In the case that the user deletes a file or a file folder, the corresponding node may be simply deleted from the file system energy tree without adjusting the energy scores of other nodes.

Likewise, for the operation that the user moves a file or a file folder, it may be decomposed to a creating process and a deleting process.

Those skilled in the art will appreciate that in order to optimize the performance of search ranking, the rules for updating energy scores of the file system energy tree in response to the user's specific operations may be designed as desired. Therefore, the specific ways of implementation do not constitute limitations on the present invention.

Figure 6:
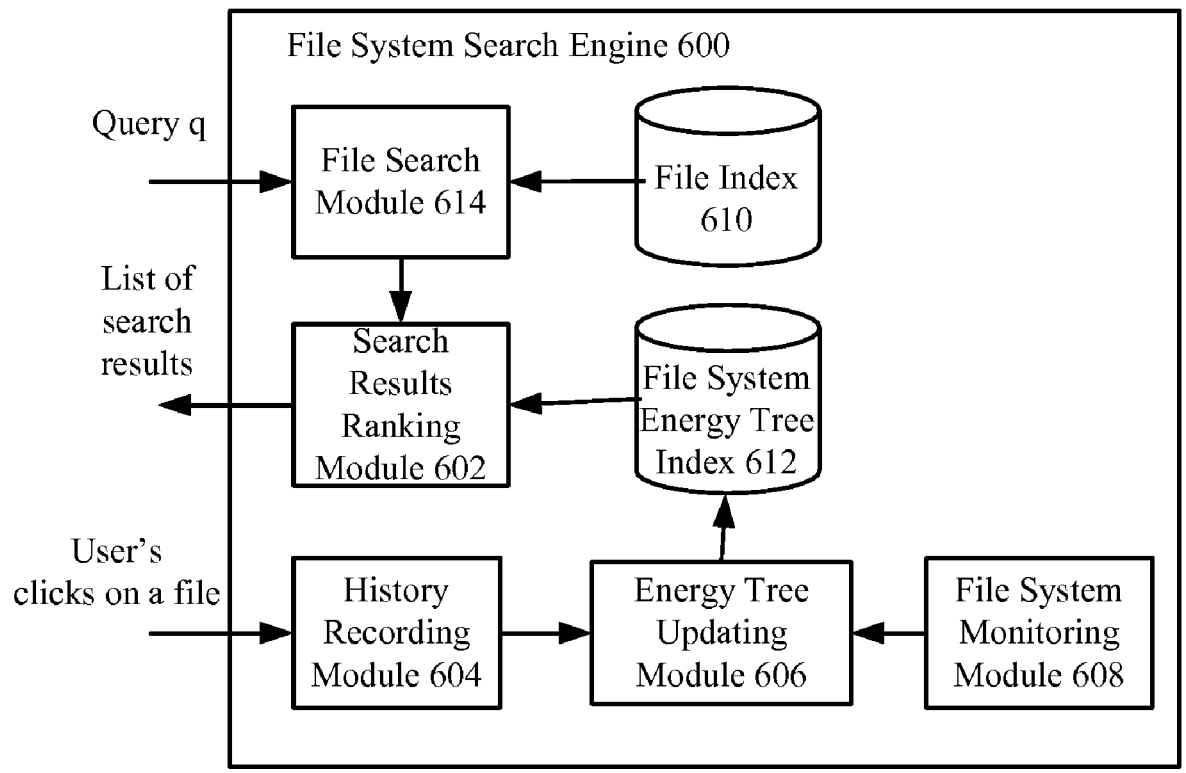
FIG. 6 shows a schematic block diagram of a file system search engine according to an embodiment of the present invention.

FIG. 6 shows a schematic block diagram of a file system search engine according to an embodiment of the present invention. In this figure, reference numeral 600 denotes a file system search engine; reference numeral 614 denotes a file search module; reference numeral 610 denotes a file index used to support the file search module 614; reference numeral 602 denotes a search result ranking module in the file system search engine; reference numeral 604 denotes a history recording module for recording file clicking and opening operations; reference numeral 606 denotes an energy tree updating module for updating a file system energy tree; reference numeral 608 denotes a file system monitoring module for monitoring changes in the file system, such as file creating, deleting and moving; and reference numeral 612 denotes a file system energy tree index in which the structure of the file system energy tree and the energy scores of respective nodes are recorded.

As shown in FIG. 6, the file system energy tree index 612 records the energy tree structure created for the file system and the energy scores of respective nodes. Upon receipt of a query q, the file search module 614 of the file system search engine 600 searches for related files based on the file index 610 and provides each file with a content score for ranking. According to the content scores provided by the file search module 614 and the energy scores of respective nodes provided by the file system energy tree index 612, the search results ranking module 602 calculates final relevance score for each file so as to be used in final search ranking. The history recording module 604 records clicks on the file by the user and provides the recorded information to the energy tree updating module 606. Based on the information provided by the history recording module 604, the energy tree updating module 606 calculates the energy scores for the nodes which need to be updated on the energy tree with the above-described energy transfer method for example, and provides results to the file system energy tree index 612 to update information of the file system energy tree. The file system monitoring module 608 monitors the user's operations on the file system, such as creating, deleting and moving a file or a file folder, and provides the recorded information to the energy tree updating module 606. Likewise, according to the above predetermined rules for example, the energy tree updating module 606 updates information recorded in the file system energy tree index 612, including information about the tree structure of the energy tree and the energy scores of corresponding nodes.

It should be noted that the file search module 614 and its corresponding file index 610 that are suitable for the file system search engine 600 according to the present invention may be of any type. For example, the file search module 614 may score the importance of a file in accordance with keywords, headers, dates and the like, and the file index 610 may be either a single centralized index structure using keywords as index or a plurality of distributed index structures. That is to say, how to compose a specific file index and how to perform file search by the file search module does not constitute limitations on the present invention. Therefore, the file system search engine according to the present invention may also treat a file folder in the file system as a file item and rank it together with files in the list of search results for output. Those skilled in the art will appreciate that the search results ranking module performs processing on each file folder similar to that on a file, i.e. calculating the final relevance score related to the current energy score for each file folder and performing search ranking.

FIG. 6 only shows an example capable of implementing a file system search engine of the present invention. Those skilled in the art will appreciate that there may be various schemes available for the concrete implementation of modules, especially when the function of each module is implemented with software. For example, the history recording module 604 and the file system monitoring module 608 as shown may be incorporated into the same module or even directly incorporated into the energy tree updating module 606.

Figure 7:
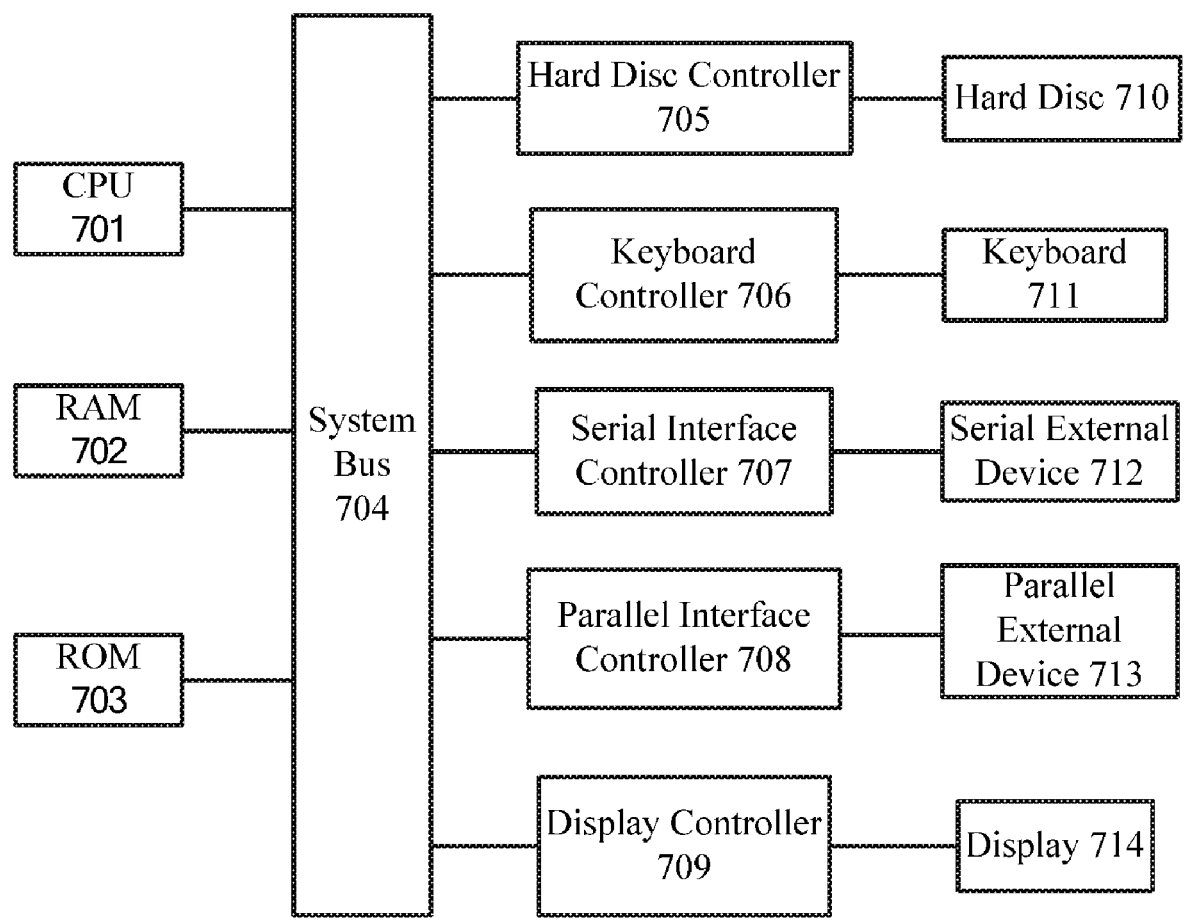
FIG. 7 schematically shows a computer system capable of implementing the embodiments of the present invention.

FIG. 7 schematically shows a computer system capable of implementing the embodiments of the present invention. The computer system as shown in FIG. 7 comprises central processing unit (CPU) 701, random access memory (RAM) 702, read-only memory (ROM) 703, system bus 704, hard disc (HD) controller 705, keyboard controller 706, serial interface controller 707, parallel interface controller 708, display controller 709, hard disc 710, keyboard 711, serial external device 712, parallel external device 713 and display 714. Among these components, the CPU 701, the RAM 702, the ROM 703, the HD controller 705, the keyboard controller 706, the serial interface controller 707, the parallel interface controller 708 and the display controller 709 are connected with the system bus 704. The hard disc 710 is connected with the HD controller 705, the keyboard 711 is connected with the keyboard controller 706, the serial external device 712 is connected with the serial interface controller 707, the parallel external device 713 is connected with the parallel interface controller 708, and the display 714 is connected with the display controller 709.

The function of each component shown in FIG. 7 is well known in the art, and the structure shown is also conventional. Such a structure is applicable not only to a personal computer but also to a handset device, such as Palm PC, personal data assistant (PDA) and a mobile phone etc. In different applications, some components in FIG. 7 may be omitted. The whole system shown in FIG. 7 is controlled by computer readable instructions usually stored as software on the hard disc 710, EPROM or other non-volatile memory. The software may also be downloaded from a network (not shown in the figure). The software either stored in the hard disc 710 or downloaded from a network may be loaded to the RAM 702, and the CPU 701 may execute the software so as to fulfill the functions determined by the software.

Although the computer system shown in FIG. 7 can support search ranking for a file system according to the present invention, the above computer system merely serves as an example of computer systems. Those skilled in the art will appreciate that many other designs for computer systems can also carry out the embodiments of the present invention.

The present invention may also be implemented as a computer program product used in the computer system as shown in FIG. 7 for example, which contains codes for implementing the search ranking method for a file system according to the present invention. The codes may be stored on a memory of other computer system before being used. For example, the codes may be stored on a removable memory such as a hard disc, an optical disc or a floppy. Alternately, the codes may be downloaded from the Internet or other computer networks.

Although the embodiments of the present invention have been described with reference to the accompanying drawings, those skilled in the art may make various modifications or alterations within the scope defined in the appended claims.

What is claimed is:

1. A computer-implemented search ranking method suitable for a file system, comprising:
   receiving a query via a computer;
   calculating final relevance scores of individual file items via said computer with respect to said query at least partially in accordance with energy scores of individual nodes on a current file system energy tree, and outputting a list of search results based on said final relevance scores; and
   updating said energy scores of said individual nodes on said file system energy tree via said computer in response to an operation on said file system performed by a user,
   wherein said file system energy tree has a tree structure corresponding to that of said file system, and said individual nodes thereof respectively correspond to the individual file items in said file system.

2. The method according to claim 1, wherein in response to a click on a file item performed by a user, the energy score of a node corresponding to said file item on said file system energy tree is increased; and
   the increased energy score of said node is at least partially transferred to other related nodes along paths on said file system energy tree.

3. The method according to claim 2, wherein the increased energy score of said node is at least partially transferred to nodes within a predetermined transfer depth and satisfies:

$$E'(n) = E(n) + p^{dist(n,d)}$$

wherein, d represents the node corresponding to said clicked file item;
n represents any node within said predetermined transfer depth;
E(n) represents the original energy score of the node n;
E'(n) represents the updated energy score of the node n;
p is the energy transfer rate with a value ranging from 0 to 1; and
dist(n, d) represents a distance from the node n to the node d along a tree path(s) on the structure of said file system energy tree, wherein dist(n, d) is smaller than or equal to the predetermined transfer depth.

4. The method according to claim 1, wherein in response to an operation performed by a user that creates a file item, a corresponding node is created on said file system energy tree, and said created node is assigned to have an energy score equal to that of its father node.

5. The method according to claim 1, wherein in response to an operation performed by a user that deletes a file item, a corresponding node is deleted from said file system energy tree.

6. The method according to claim 1, wherein in response to an operation performed by a user that moves a file item from a first position to a second position, a corresponding node is deleted from the first position of said file system energy tree, a corresponding node is created in the second position of said file system energy tree, and the created node is assigned to have an energy score equal to that of its current father node.

7. The method according to claim 1, wherein said file system energy tree is initialized such that the individual nodes have equal energy scores.

8. The method according to claim 1, wherein said file item includes file and file folder.

9. A computer-implemented file system search engine, comprising a file search module, a file index, and a search results ranking module, the file system search engine that searches for a file item in accordance with a received query and outputting a list of search results, the file system search engines further comprising:
   a file system energy tree index that records a file system energy tree via a computer having a tree structure corresponding to that of said file system and energy scores of individual nodes thereof, said individual nodes respectively corresponding to the individual file items in said file system; and
   an energy tree updating module that updates said energy scores of said individual nodes on said file system energy tree by said computer recorded in said file system energy tree index in response to an operation on said file system performed by a user,
   wherein said search results ranking module calculates final relevance scores of individual file items with respect to the query at least partially in accordance with the respective energy scores of the individual nodes recorded in said current file system energy tree index so as to rank the file items in said list of search results in accordance with said final relevance scores.

10. The file system search engine according to claim 9, wherein, in response to a click on a file item performed by a user, said energy tree updating module increases the energy score of a node corresponding to said file item recorded in said file system energy tree index, and at least partially transfers the increased energy score of said node to other related nodes along paths on said file system energy tree.

11. The file system search engine according to claim 10, wherein said energy tree updating module calculates the energy scores of nodes which need to be updated in said file system energy tree index with the following expression:

$$E'(n)=E(n)+p^{dist(n,d)}$$

wherein, d represents the node corresponding to said clicked file item;

n represents any node within a predetermined transfer depth;

E(n) represents the original energy score of the node n;

E'(n) represents the updated energy score of the node n;

p is the energy transfer rate with a value ranging from 0 to 1; and dist(n, d) represents a distance from the node n to the node d along a tree path(s) on the structure of said file system energy tree, wherein dist(n, d) is smaller than or equal to the predetermined transfer depth.

12. The file system search engine according to claim 9, wherein in response to an operation performed by a user that creates a file item, said energy tree updating module creates a node corresponding to said created file item in said file system energy tree index, and assigns said created node to an energy score equal to that of its father node.

13. The file system search engine according to claim 9, wherein in response to an operation performed by a user that deletes a file item, said energy tree updating module deletes a node corresponding to said deleted file item from said file system energy tree index.

14. The file system search engine according to claim 9, wherein in response to an operation performed by a user that moves a file item from a first position to a second position, said energy tree updating module deletes a node corresponding to said moved file item from the first position of said file system energy tree recorded in said file system energy tree index, creates a node corresponding to said moved file item in the second position of said file system energy tree recorded in said file system energy tree index, and assigns the created node to an energy score equal to that of its current father node.

15. The file system search module according to claim 9, further comprising:

a history recording module that obtains clicks on file item(s) performed by a user and providing corresponding information to said energy tree updating module.

16. The file system search engine according to claim 9, further comprising:

a file system monitoring module that monitors operations performed by a user that creates, deletes and moves file item(s) on the file system, and providing corresponding information to said energy tree updating module.

17. The file system search module according to claim 9, wherein during initializing said file system search engine, the individual nodes recorded in said file system energy tree index have equal energy scores.

18. The file system search engine according to claim 9, wherein said file item includes file and file folder.

19. A computer storage medium readable by a computer tangibly embodying a program of instructions executable by said computer for performing a method for search ranking suitable for a file system, said method comprising:

receiving a query;

calculating final relevance scores of individual file items with respect to said query at least partially in accordance with energy scores of individual nodes on a current file system energy tree, and outputting a list of search results based on said final relevance scores; and updating said energy scores of said individual nodes on said file system energy tree in response to an operation on said file system performed by a user, wherein said file system energy tree has a tree structure corresponding to that of said file system, and said individual nodes thereof respectively correspond to the individual file items in said file system.

* * * * *